Dec. 27, 1949     T. O. HOLM ET AL     2,492,151
SELECTOR COCK

Filed Nov. 22, 1943     2 Sheets-Sheet 1

Inventors
Thor O. Holm
Russell R. Fike
by Charles H. Lull Attys

Dec. 27, 1949  T. O. HOLM ET AL  2,492,151
SELECTOR COCK

Filed Nov. 22, 1943  2 Sheets-Sheet 2

Inventors
Thor O. Holm
Russell R. Fike
by Charles W. Hills Attys

Patented Dec. 27, 1949

2,492,151

UNITED STATES PATENT OFFICE 2,492,151

SELECTOR COCK

Thor O. Holm and Russell R. Fike, Cleveland, Ohio, assignors to Thompson Products, Inc., a corporation of Ohio Application November 22, 1943, Serial No. 511,224

3 Claims. (Cl. 251—107)

The present invention relates to a fluid control valve for regulating the flow of fluid in a system. More particularly, the present invention concerns a selector cock such as may be employed to advantage in handling the supply of fuel from one or more storage tanks located in various parts of an airplane or other similar apparatus to the motors or engines therefor.

According to the present invention, there is provided a selector cock which embodies an internal chamber having a surface adapted to accommodate tilting movements, being advantageously formed of generally hemispherical shape, and a hollow valve or plug member having an external surface which conforms substantially to that of the inner wall of the casing chamber. The valve member has a configuration defined by a surface of revolution and is preferably of generally hemispheroidal shape, although it may assume other kindred forms.

The structure of the selector cock of the present invention is such that any slight cocking or tilting of the valve member, should it occur, will not in any way affect the efficient operation of the unit. The valve member is adapted by reason of its shape to contact the several sealing members provided in the casing of the unit upon any portion of its surface to insure a complete seal with respect to the chamber wall. Moreover, in view of the cooperation between the chamber and the valve member disposed therein, there is less likelihood of excessive tilting or cocking of the valve member in the casing. There is a greater tendency for the valve member to right itself and to overcome any tilting effect with respect to the casing in the course of its operation. Moreover, the structure of the selector cock of the present invention is comparatively simple, involving a small number of easily fabricated and machined parts and is, therefore, economical to manufacture.

It is, therefore, an object of the present invention to provide a selector cock which possesses the aforementioned attributes.

Another object is to provide a selector cock which, by virtue of the cooperation between the configurations of the valve member and the casing with which it is associated, minimizes the possibility of cocking or tilting of the valve member with respect to said casing and completely eliminates the harmful effects ordinarily experienced as a result of such a relationship between the elements in the operation of the unit.

A further object is to provide a selector cock having a small number of cooperating parts which are comparatively easy to manufacture thereby maintaining a low production cost per unit.

A still further object of the present invention is to provide a selector cock unit which affords efficient control of the fluid in the system to which it is applied and maintains a flow therethrough with a minimum drop in pressure.

Another and still further object of the invention is to provide a valve member for a selector cock or plug type valve unit which is formed with a very limited number of special machining operations.

Still other features and objects of the invention will be apparent from the following description of the annexed sheets of drawings illustrating one embodiment of the present invention.

Figure 1:
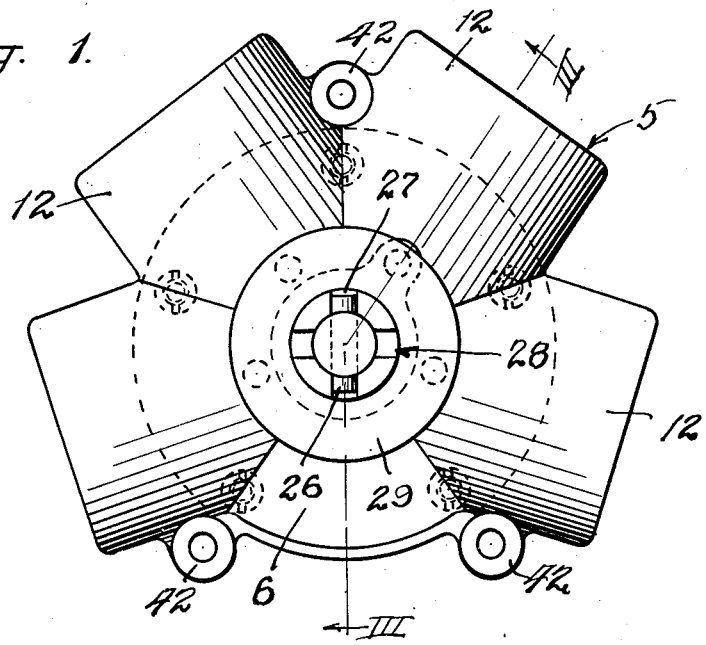
Figure 1 is a plan view of one form of selector cock embodying the principles of the present invention.
Figure 2:
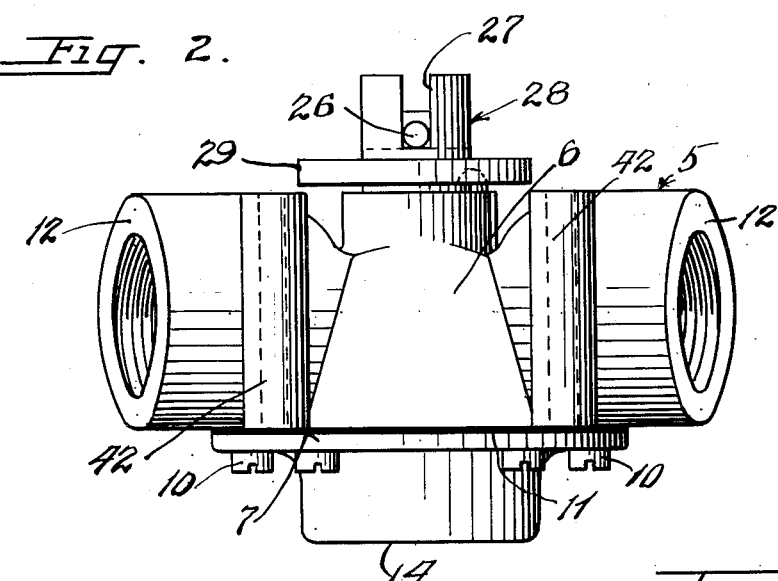
Figure 2 is an elevation of the selector cock of Figure 1.
Figure 3:
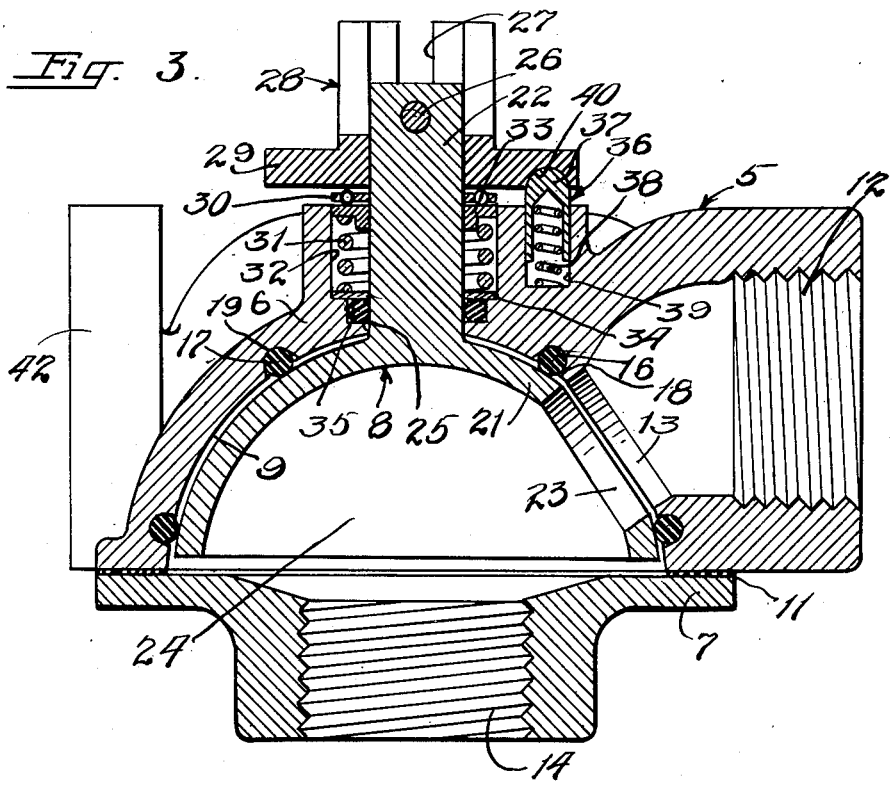
Figure 3 is a vertical cross-section taken along the line III—III in Figure 1.
Figure 4:
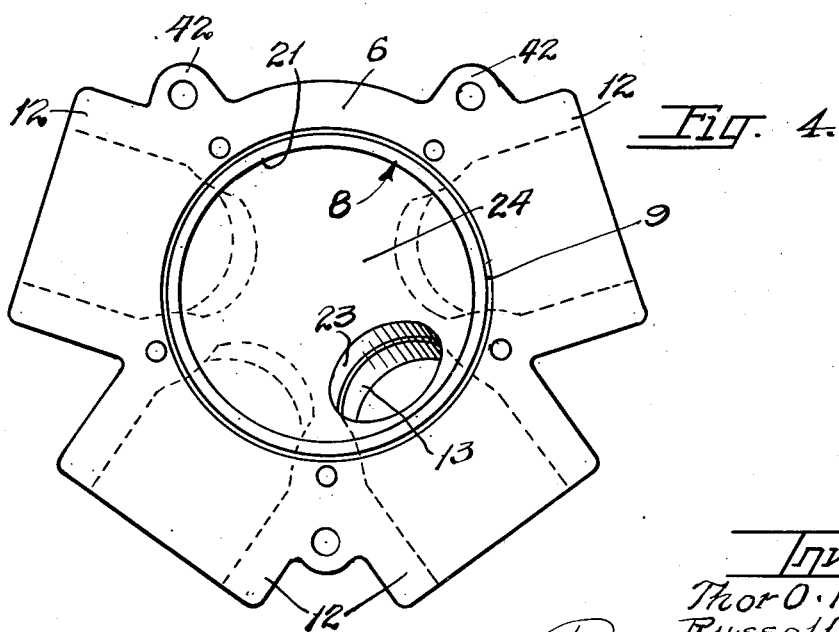
Figure 4 is a plan view of the selector cock from the base thereof with parts removed to illustrate the internal chamber.

The valve unit or selector cock 5 which embodies the principles of the present invention comprises, generally, a casing 6 in the internal chamber 9 of which is disposed a rotary valve member 8. The casing 6 which may be said to have a substantially domed configuration is open-mouthed and provided with a cover plate 7 which is secured to the under side thereof as by means of a plurality of screws 10 or other suitable fastening means which may be threaded into the casing 6 to form the base of the chamber 9. A gasket 11 is provided between the cover plate 7 and the base of the casing 16 to prevent leakage of the fluid being handled by the selector cock from the chamber 9 between the contiguous faces of the two members.

The casing 6 of the selector cock 5 is advantageously provided with a plurality of hollow bosses or inlet connections 12 which extend in substantially radial directions from the center of the casing and are internally threaded or otherwise fitted to accommodate one or more pipe connections, tubes, hoses or other like conduits for supplying fluid to the chamber 9 of the cock 5. Each of the connections 12 communicates with the chamber 9 of the casing 6 as by means of a port 13 at the base thereof. The cover plate 7 is provided with a hollow boss portion which takes the form of an internally threaded outlet connection 14 which serves to provide engagement for a pipe, tube, hose or other like conduit for removing the fluid admitted to the chamber 9 of the casing 6 by the inlet connections 12 and their associated ports 13.

The inlet connections 12 and their associated ports 13 are advantageously arranged at equally spaced intervals about the casing 6. Each of the ports 13 is sealed off with respect to the valve member 8 as by means of suitable sealing means 16 such, for example, as an O-ring seal which may be formed of rubber, neoprene, synthetic rubber or other similar resilient plastic material which will withstand attack from the fluid being handled by the cock 5. A similar sealing means 17 is provided in the blank wall of the chamber 9 of the casing 6 in spaced relation with respect to the other sealing means 16 so as to provide a positive seal for the valve member 8 when the selector cock 5 is shut-off and also to provide uniformly spaced sealing contact with the valve member 8 to minimize the possibility of tilting or cocking of said valve member 8 with respect to the casing 6. The sealing means 16 and 17 are advantageously press-fit or otherwise suitably secured in annular grooves 18 and 19, respectively, formed in the wall of the chamber 9 of the casing 6.

The valve member 8 is advantageously formed with an open-mouthed dome shaped base 21 and an integral generally cylindrical stem portion 22. The base portion 21 of the valve 8 is provided with a port 23 extending through the wall thereof and communicating with the open-mouthed compartment 24 formed within said open-mouthed base portion 21. The port 23 in the valve member 8 is adapted upon rotation of said valve member to interconnect a port 13 of one of the inlet connections 12 with the inner chamber or compartment 24 and the outlet connection 14 in the cover member 7 by virtue of the open end of the base portion 21 of said valve member. Alternatively, the port 23 in the base portion 21 of the valve 8 may upon rotation of the valve member be disposed adjacent the blank portion of the wall of the chamber 9 of the casing 6 in which case it will be sealed off by the sealing means 17 and the flow of fluid through the selector cock 5 will be discontinued.

The stem portion 22 of the valve 8 projects through a bore 25 disposed substantially centrally of the casing 6. A pin 26 is press-fit or otherwise suitably secured in a diametrically disposed aperture extending through the outermost end of the stem portion 22. This pin 26 engages a slot 27 in the yoke member 28. The yoke member 28 is attached as by means of a suitable flexible coupling means with shift levers or similar means (not shown) for rotating the valve member 8 with respect to the casing 6 as desired.

The yoke member 28 has a flanged portion 29 against the under surface of which is disposed a suitable anti-friction bearing 30. The bearing 30 is urged against the flanged portion 29 of the yoke 28 as by means of a compression spring 31 inserted in a counter-bore 32 formed in the upper end of the casing 6 so as to encircle the stem portion 22 of the valve member 8. A suitable washer 33 having a depending flanged portion on the under side thereof serves to position the spring 31 with respect to the stem portion 22 of the valve member 8 and also forms a ball race for the bearing 30.

The spring 31 in addition to urging the bearing 30 in place against the flanged portion 29 of the yoke 28 also exerts pressure against a washer 34 in the base of the counterbore 32 which in turn holds in place an O-ring seal 35. The seal 35, which may be generally similar to seals 16 and 17 associated with the chamber 9 of the casing 6, serves to prevent leakage of the fluid being handled by the selector cock 5 about the stem portion 22 of the valve member 8 where it projects through the bore 25 in the casing 6.

To assist in the operation of the selector cock 5 a suitable indexing means is incorporated in the unit and may take the form of the position finder assembly 36. The assembly 36 comprises a domed shell 37 which slidably engages a bore 39 in the casing 6 and is urged outwardly against the under surface of the flanged portion 29 of the yoke 28 as by means of a compression spring 38. As the yoke 28 is rotated thereby shifting the position of the valve member 8 with respect to the casing 6, the domed shell 37 rides upon the under side of the flanged portion 29 until it registers with one of a plurality of dimples 40 formed in the face thereof. Each dimple 40 is disposed coincident to the position of each of the ports 13 associated with an inlet connection 12 and indicates when the port 23 of the valve member 8 is in registry with a port 13 for fluid flow communication between the inlet connection 12 and the outlet connection 14.

Although no dimple 40 has been provided in the illustrated embodiment of the invention shown in Figure 1 of the drawings associated with the closed position for the valve member 8 with respect to the casing 6, one such means may be so provided. This means will readily indicate to the operator that the valve member 8 is positioned with its port 23 completely sealed off by the seal 17 and out of communication with any of the inlet connections 12.

The operation of the selector cock 5 will be apparent from the foregoing description of the structure and no detailed explanation of its operation is deemed to be necessary since it operates generally along the lines of conventional structures. It will be understood, however, that by reason of the configuration of the base portion 21 of the valve member 8, any slight cocking or tilting of the valve member with respect to the casing 6 cannot result in damage to either of the parts nor will leakage occur therebetween since the valve member is always uniformly supported in any position by the several equally spaced sealing rings 16 and 17. The valve member 8 has the added important feature of being simple to fabricate with a minimum of machining. The valve member 8, therefore, represents a highly advantageous element of the selector cock structure and aids materially in reducing the cost of manufacture.

The casing 6 of the selector cock 5 may be provided with a plurality of integrally formed, or otherwise suitably attached, vertically extending cylindrical mounting means 42. The mounting means 42 are characterized by a hollow cylindrical bore extending lengthwise thereof for the reception of mounting bolts or other suitable fastening means for securing the selector cock to the apparatus with which it is intended to be employed.

The selector cock structure of the present invention is advantageously employed in the handling of the supply of fuel and controlling the flow of the same from the fuel tanks of an airplane or other like apparatus to the engines or motors employed in driving it. It is obvious that the structure is equally advantageously employed in any fluid handling system for the control of the fluid supply from one or more sources to a single outlet or receptacle.

It will, of course, be understood that various details of construction may be varied through a wide range without departing from the principles of this invention and it is, therefore, not the purpose to limit the patent granted hereon otherwise than necessitated by the scope of the appended claims.

We claim as follows:

1. A selector cock comprising a multi-ported casing providing an internal chamber having said ports extending radially outward from the center thereof and embodying a wall surface accommodating tiltable movements thereon, a cover member for said casing having a port therein, a hollow valve member rotatably mounted in the chamber in said casing having a configuration defined by a surface of revolution, said valve member having an aperture therein, a plurality of sealing means disposed in the wall of the chamber of the casing in equally spaced relation and uniformly supporting the valve member from the wall surface thereof, each of said sealing means but one encircling a port in the casing, a stem portion on the valve member projecting through the casing at a point substantially centrally thereof for selectively positioning the valve member in the chamber of the casing with its aperture alternatively in interconnection with one of the ports in the casing and the outlet in the cover member and out of interconnection with any of the ports in said casing, means on said stem portion for rotating the valve member, a compressible seal disposed between said stem portion and said casing, resilient means between said rotating means and said compressible seal for urging the valve member into contact with the sealing means, and anti-friction means between said rotating means and said resilient means.

2. A valve comprising a hemispherical casing having a rounded wall, a flat wall and an external well opposite the flat wall, a first port in the rounded wall of said casing, a second port in the flat wall of said casing, a hemispherical plug in said casing having an aperture registrable with said first port, a plurality of equally spaced annular sealing means on the interior of said casing one of which seals about said first port, said sealing means supporting said plug and being selectively alignable with said plug aperture in sealing relation therewith by rotation of said plug in said casing, a stem on said plug extending through said well, a flange on said stem spaced from said well, a seal in said well about said stem, an anti-friction bearing having its anti-friction elements engaging said flange, and a spring under compression in said well acting on said bearing to bias the plug toward tight engagement with said sealing means and acting on said seal to urge the seal into tight sealing engagement about said stem.

3. A valve comprising a hemispherical casing having a rounded wall and a flat wall, a plurality of equally spaced sealing means on the interior of the rounded wall of said casing, a plurality of radial ports in said wall smaller in number than said sealing means and each encircled by one of said sealing means, an axial port in the flat wall of said casing, a hemispherical plug rotatably seated on said sealing means and having an aperture therein registrable with each of said radial ports to connect said axial port therewith, a stem on said plug extending through said casing, a seal about said stem on the exterior of said casing, an abutment on said stem, and a resilient member compressed between said seal and said abutment to urge the plug into secure sealing relation with said sealing means and to urge said seal into secure relation with said stem and casing.

THOR O. HOLM.
RUSSELL R. FIKE.

REFERENCES CITED

The following references are of record in the file of this patent:

UNITED STATES PATENTS

| Number | Name | Date |
|---|---|---|
| 1,003,752 | Jenkins | Sept. 19, 1911 |
| 1,243,237 | Wood | Oct. 16, 1917 |
| 1,492,883 | Kidder | May 6, 1924 |
| 1,608,412 | Mechling | Nov. 23, 1926 |
| 1,724,686 | Snebold | Aug. 13, 1929 |
| 1,906,313 | Clifford | May 2, 1933 |
| 1,972,821 | Weatherhead | Sept. 4, 1934 |
| 1,999,496 | Adams | Apr. 30, 1935 |
| 2,198,386 | Hiester | Apr. 23, 1940 |
| 2,226,169 | Koehler | Dec. 24, 1940 |
| 2,227,542 | Grove | Jan. 7, 1941 |
| 2,233,840 | Koehler | Mar. 4, 1941 |
| 2,240,074 | Kain | Apr. 29, 1941 |

FOREIGN PATENTS

| Number | Country | Date |
|---|---|---|
| 6,113 | Great Britain | 1831 |
| 665,650 | Germany | Sept. 30, 1938 |